(12) United States Patent
Halvorsen (10) Patent No.: US 8,530,778 B2
(45) Date of Patent: Sep. 10, 2013

(54) ARRANGEMENT AND METHOD FOR BLANKET GAS SUPPLY CONTROL FOR AN ELECTRICAL WELDING APPARATUS

(75) Inventor: Arild Halvorsen, Averøy (NO)

(73) Assignee: Alexander Binzel Schweisstechnik GmbH & Co. KG, Buseck (DE)

( * ) Notice: Subject to any disclaimer, the term of this patent is extended or adjusted under 35 U.S.C. 154(b) by 828 days.

(21) Appl. No.: 12/524,443

(22) PCT Filed: Jan. 23, 2008

(86) PCT No.: PCT/NO2008/000022
§ 371 (c)(1),
(2), (4) Date: Mar. 9, 2010

(87) PCT Pub. No.: WO2008/091160
PCT Pub. Date: Jul. 31, 2008

(65) Prior Publication Data
US 2010/0176092 A1    Jul. 15, 2010

(30) Foreign Application Priority Data
Jan. 24, 2007   (NO) .................................. 20070472

(51) Int. Cl.
*B23K 9/00* (2006.01)
(52) U.S. Cl.
USPC ..... 219/74; 219/75; 219/130.21; 219/130.32; 219/130.33; 219/13.31
(58) Field of Classification Search
USPC .......................................................... 219/74
See application file for complete search history.

(56) References Cited

U.S. PATENT DOCUMENTS

| | | | |
|---|---|---|---|
| 3,808,397 A | | 4/1974 | Wixson |
| 4,079,231 A | * | 3/1978 | Toth .......................... 219/130.32 |
| 5,932,123 A | * | 8/1999 | Marhofer et al. ........ 219/130.01 |
| 6,130,407 A | * | 10/2000 | Villafuerte ............... 219/130.01 |

(Continued)

FOREIGN PATENT DOCUMENTS

| | | |
|---|---|---|
| JP | 61185087 A | 8/1986 |
| JP | 02-090719 A | 4/1992 |

(Continued)

OTHER PUBLICATIONS

International search report dated Apr. 11, 2008 in corresponding PCT/NO2008/000022.
Japanese Office Action, dated Sep. 28, 2012, in corresponding 2009-547188.

*Primary Examiner* — Robert J Hoffberg
*Assistant Examiner* — Igwe U Anya
(74) *Attorney, Agent, or Firm* — Young & Thompson (57) ABSTRACT

Apparatus and method for controlling blanket gas flow in an electrical welding facility, wherein welding is performed using a welding electrode in electrical connection with a welding machine unit. The apparatus includes an electric measuring device having a current sensor for determining the magnitude of an electrical welding current carried in a circuit incorporating the welding electrode and having a current sensor output adapted to provide a I signal indicating the current magnitude, and a voltage sensor for determining the magnitude of electrical voltage applied to the welding electrode and having a voltage sensor output for providing a U signal indicating the voltage magnitude, and a control device having inputs connected to the current sensor output and the voltage sensor output, respectively, and a control signal output for providing a control signal to a blanket gas flow controller.

20 Claims, 6 Drawing Sheets

(56) References Cited

U.S. PATENT DOCUMENTS

| | | |
|---|---|---|
| 6,255,618 B1 * | 7/2001 | Shintani et al. .......... 219/121.46 |
| 6,583,386 B1 | 6/2003 | Ivkovich |
| 2004/0226921 A1 * | 11/2004 | Picard et al. ............. 219/121.55 |
| 2005/0224466 A1 * | 10/2005 | Halvorsen ....................... 219/74 |
| 2006/0091118 A1 * | 5/2006 | Eldridge .................. 219/121.54 |
| 2008/0023451 A1 * | 1/2008 | Salsich et al. ............ 219/121.48 |

FOREIGN PATENT DOCUMENTS

| | | |
|---|---|---|
| JP | 2003191075 A | 7/2003 |
| JP | 2006253132 A | 9/2006 |
| RU | 2179912 | 2/2002 |
| WO | 02066195 | 8/2002 |
| WO | 03082509 | 10/2003 |

* cited by examiner

ARRANGEMENT AND METHOD FOR BLANKET GAS SUPPLY CONTROL FOR AN ELECTRICAL WELDING APPARATUS

BACKGROUND OF THE INVENTION

1. Field of the Invention

The present invention relates to the field of providing blanket gas, also referred to as shielding gas or active gas, to a welding point in an electrical welding apparatus, particularly to a method and device for controlling blanket gas (shielding gas; active gas) flow in various stages of a welding operation.

2. Description of the Related Art

For electrical welding operations where the welding point is to be provided with a blanket of inert blanket gas, it is common to provide the blanket gas from a centralized blanket gas supply installation, or from a gas cylinder located in the vicinity of the welding machine unit of the welding apparatus. The blanket gas provided by the supply installation or the gas cylinder typically is provided with a gas pressure that exceeds the pressure at which the blanket gas can be controlled by the blanket gas control means of the welding apparatus. In order to reduce the pressure to level at which the gas conveniently can be delivered to the welding apparatus, and be controlled by a control valve in the welding apparatus switching on and off the flow of blanket gas, a pressure reduction device is inserted in the blanket gas supply line in a location proximal to the gas cylinder or the gas supply installation. Thus, a section of the gas supply line, in which the gas is provided at a lower gas pressure than in the gas supply installation or gas cylinder, exists between the pressure reduction device and the welding machine itself. Typically, this "low pressure" section of the supply line is of a considerable length, in order to allow practical use of the welding machine unit, which often is required to be easily relocatable in order to reach differently located areas at which the welding work is to be performed. Further details with regard to the aspects of the low pressure supply line and the control of blanket gas supply for an electrical welding apparatus is provided in the present applicant Norwegian patent application no. 20021557, and corresponding applications claiming priority from the aforementioned application.

For the welding process requiring an appropriate supply of blanket gas to maintain a consistent quality of the welding work there is performed, the correct supply of blanket gas is dependent on number of different factors. One of these is the electrical current of the welding art established between the welding electrode and the electrically conductive object being welded, while another important factor is the design of the electrical welding machine itself, particularly with regard to how the supply of the blanket gas is controlled with respect to the actual welding operations being performed. The latter is also important with regard to the economy of operating an electrical welding apparatus, as the consumption of blanket gas for welding operations is an important factor in the overall economy of an operator of a facility that provides welding services based on electrical art welding, for whom it will be important to control the consumption of blanket gas in order to minimize the consumption of possibly expensive blanket gas, while still meeting the requirements to the quality of the weld produced during the welding operation.

The flow of blanket gas to the weld spot typically is controlled by actuating a blanket gas valve in the welding machine from a control signal that controls the application of a voltage to the welding electrode or the motor of the feed arrangement to feed a continuous electrode in case of a MIG welding apparatus, or a signal that is related to any of the aforementioned. Upon the actuation of the blanket gas valve in the welding apparatus, which opens for gas flow to the welding spot by way of a gas supply line in a flexible hose for supply of both gas and electrical power to the welding area, the blanket gas flows at a rate set by a flow control device that typically is arranged in conjunction with the pressure control device mentioned above. With the flow control system disclosed by Norwegian patent application no. 20021557, the flow of blanket gas is dynamically controlled as a function of the feed rate of the continuously fed welding electrode wire, the feed rate preferably being indicated by a voltage applied to an electrical motor of the feeding arrangement to control the feed rate, or as a function of a welding current setting made by an operator or by a system operating the welding machine. By the device and method of Norwegian patent application no. 20021557, the supply of blanket gas to where the welding work is being done may be optimized with regard to the supply of welding gas as the actual welding work proceeds.

A shortcoming in the arrangements and methods for supply of blanket gas for electrical welding in an electrical welding machine remains, as such prior art arrangements and methods are not concerned with the effects of the blanket gas supply rate prior to or at the time when heat is being generated in the initial face of a particular welding operation.

SUMMARY OF THE INVENTION

The objects of the invention is to provide a solution to the above and other problems related to the initial phase of an electrical welding operation, and to provide an improvement to welding operations an welds produced as related to the initial phase of an electrical welding operation.

The present invention provides an apparatus identified by the features being recited in the accompanying patent claims 2 and 6, respectively.

The present inventors have found that electrical welding operations benefit by controlling the flow of blanket gas specifically during a brief period prior to, or on, the instant at which heat is being built up in the initial face of a welding operation. By carefully controlling the flow of blanket gas in the initial face of a particular welding operation, it has been found that a consistent quality of the weld is obtainable, which, naturally, is important to any welding operation, and, indeed, particularly advantageous when the welding work is being performed in a number of brief welding periods.

BRIEF DESCRIPTION OF THE DRAWINGS

In the following, the invention will be explained in more detail by way or example and with reference to the attached drawings, wherein.

DETAILED DESCRIPTION OF THE INVENTION

In the following, the invention will be explained in more detail by way of advantageous embodiments.

Figure 1:
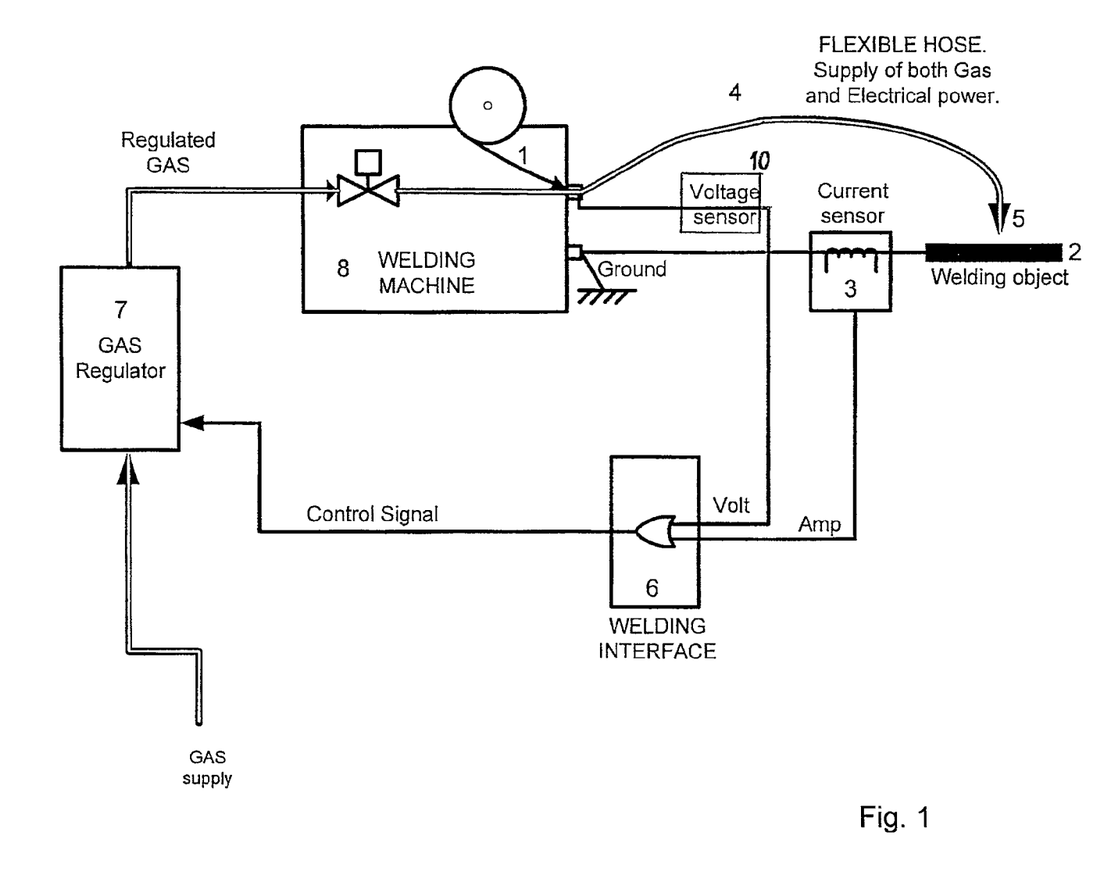
FIG. 1 illustrates an electrical welding apparatus provided with a first exemplary embodiment of the present invention.

FIG. 1 illustrates a first embodiment of the present invention, wherein a gas regulator 7 inserted in the blanket gas supply line of an electrical welding machine 8 is adapted to regulate to its output the flow of blanket gas in response to a control signal being derived by a welding interface 6 from a voltage signal provided by a voltage sensor arranged to sense a voltage supplied by the welding machine 8 to a welding electrode 5, and a current signal (a) provided by a current sensor 3 arranged to sense a current flowing in a welding current path, such as current flowing in a conductive circuit from an electrical welding current supply in the welding machine 8 to the welding electrode 5, or, more preferably, in an electrical connection between the object being welded 2 and the welding machine 8. The welding interface device 6 receives the voltage signal (volt) and current signal (a) from the voltage sensor 9 and current sensor 3. In response to the input from the voltage sensor 9 and the current sensor 3, the welding interface device 6 generates the control signal that is provided to a gas regulator 7 arranged to regulate the flow of blanket gas from the gas supply to the welding machine 8. In a further variant of the embodiment illustrated in FIG. 1, the welding interface device 6 can be integrated with the gas regulator 7, however, due to the nature of electrical welding with high and rapidly changing currents and voltages, that give rise to significant electrical noise, keeping the welding interface device 6 at or within the welding machine 8 may be advantageous for simplification of the electrical circuitry to avoid ground loops and long electrical lines for the signals from the voltage sensor and the current sensor that may pick up noise from the welding machine 8 itself or other nearby, electrical devices, and by providing the control signal as a high district level signal to the gas regulator 7 to make it less sensitive to sources of electrical noise in its surroundings. An example of the gas regulator 7 having the welding interface 6 as an integrated part is illustrated in FIG. 2.

Figure 3:
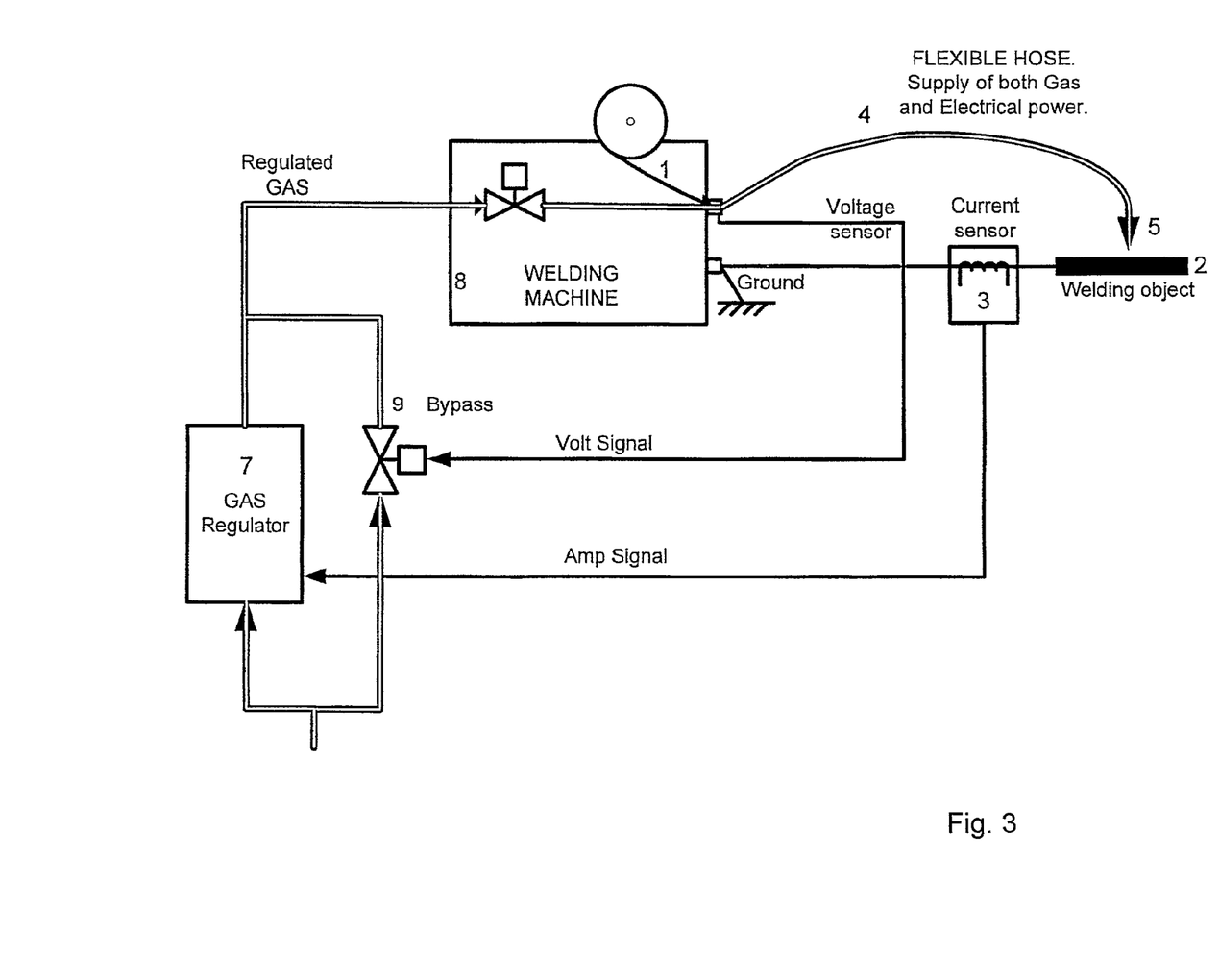
FIG. 3 illustrates schematically an electrical welding apparatus provided with a third exemplary embodiment of the present invention.

FIG. 3 illustrates systematically yet another embodiment of the present invention. In the embodiment illustrated in FIG. 3, instead of including a welding interface device 6 that generates a control signal to gas regulator 7 on basis on both the voltage and current sensors, respectively, blanket gas flow control is provided by separate first and second blanket gas flow control means, represented in FIG. 3 by the gas regulator 7 and the bypass 9, which controlled by separate signals to control respective parts of the total flow of blanket gas to the welding machine 8.

Figure 2:
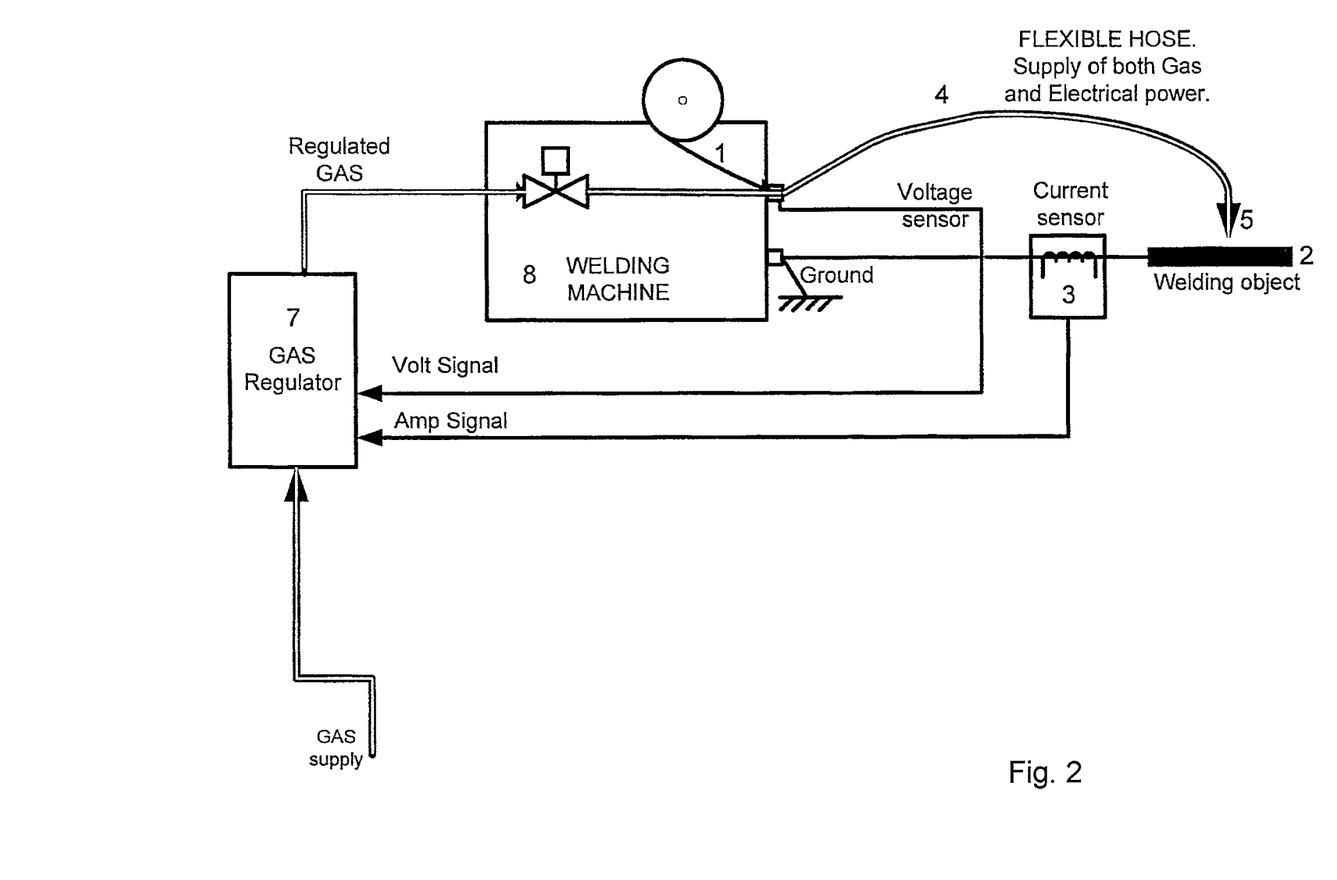
FIG. 2 illustrates schematically an electrical welding apparatus provided with a second exemplary embodiment of the present invention.

With reference to the disclosures provided above of the embodiments, and variants, illustrated by FIGS. 1, 2 and 3, further advantageous of the different embodiments and variants are now elaborated upon. In the case of the embodiment illustrated in FIG. 1, a welding machine 8 already connected to a regulated gas supply by means of a gas regulator 7 arranged an operating according to the gas regulator disclosed in Norwegian patent application no. 20021557, the provision of the welding interface device 6 adds functionality for controlling the gas flow in the very first face of a welding operation, while maintaining the operational characteristics and benefits of the gas regulator 7 to provide a dynamic blanket gas flow control during the course of the particular welding operation. For that purpose, the variation of the control signal provided by the welding interface device 6 of FIG. 1 may have a variation that is proportional to the welding current sensed by the current sensor 3, or, where reference to FIGS. 2 and 3, under direct control of the current signal (amp) provided by the current sensor 3. In the case of providing by the present invention a separate welding interface device 6, as depicted schematically in FIG. 1, and existing system comprising a welding machine 8 and a gas regulator 7 providing dynamic control of the blanket gas flow, maybe easily retrofitted to provide a precise control of the blanket gas flow in the brief period before and immediately around the onset of the welding art, which control is not available by prior art solutions. Also, with respect to providing a means for retrofit of existing welding machines 8 with gas regulator 7, the latter which already is connected to provide dynamic blanket gas flow control for the actual welding period, retrofit is possible by the inclusion of the bypass flow control means 9 and a voltage sensor 10 providing a voltage signal (volt) to the bypass flow control means 9, thus providing the necessary means and functions to obtain a precise control of the blanket gas flow immediately before and/or at the onset of the actual welding.

Figure 4:
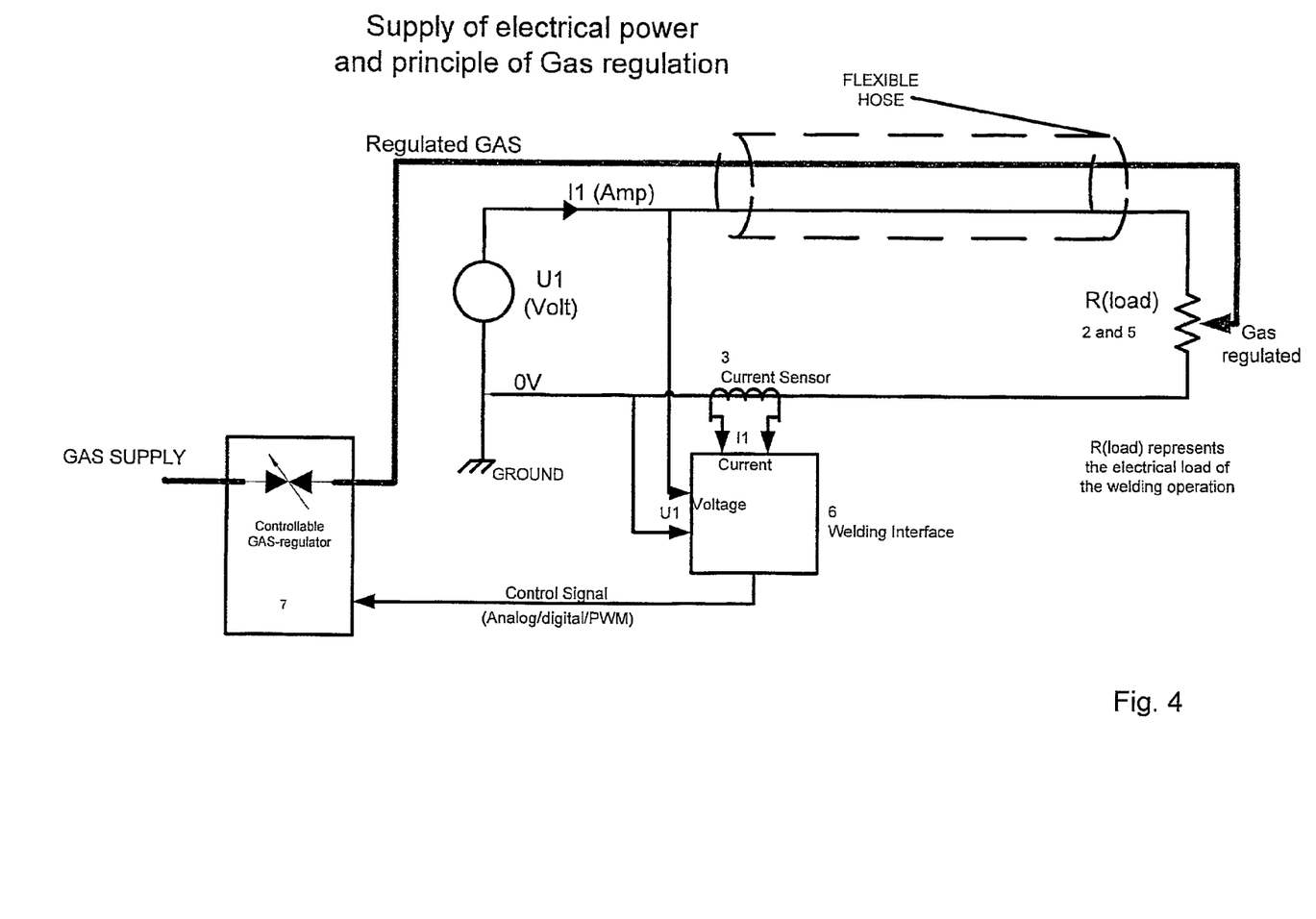
FIG. 4 illustrates schematically the electrical and gas supply interfaces and connections of an embodiment of the present invention to a welding apparatus.

Reference is now made to FIG. 4, for an explanation of the present invention and its employment by way of a schematic illustration of the electrical circuits and gas flow paths of a system employing the present invention. According to the schematic illustration of FIG. 4, it is a measurement of a voltage, which is supplied to the welding electrode shortly before the actual welding starts, which is important for the present invention. With regard to the control of the flow of blanket gas, one objective of the present invention is to provide a means and a method by which the hose that carries the blanket gas to the welding head 5 of the welding apparatus is filled with gas in order to ensure that blanket gas is provided to the area where the welding takes place at the time when the welding arc is initiated. A measurement of the current is used as a reference value for the gas regulator 7 to achieve a flow of blanket gas that is properly adapted to the actual conditions set for the welding operation, and in particular to the current setting. This reference value (control signal) may have different formats, as it maybe provided by an analogue signal, a digital signal, a pulse with modulated signal (PAM) or other format, has maybe found suitable for the actual welding machine being employed.

The welding operation comprises a supply of a voltage $U1$ via the welding electrode 1, which welding electrode 1 maybe a continuously fed wire, which is brought into electrical contact with the electrical conductive part of the welding object 2. At the time of contact between the welding electrode 1 and the welding object 2, the voltage applied to the welding electrode 1 typically is pulled down to a level where the current $I1$ is sufficiently large to maintain the voltage at a lower level. This current may in fact be as large as several hundreds of amperes, and the power being developed at the welding point is calculated by the formula $P=U\times I$, which normally is in the range of a kilowatt on ward. To assure that the quality of the weld is good, it is important that the area at which the welding electrode is in electrical contact with the welding object, it being in the very initial face when the arc is being developed or after the establishment of the arc, we present an atmosphere having a low oxygen content, or, preferably, no oxygen at all. By supplying an inert blanket gas, which is free of oxygen or other gases that may react with the molten material in an undesirable way, to sure that is the area which is the area between the welding electrode 1 and the welding object 2 is covered by the blanket gas throughout the entire welding operation.

Typically, as illustrated in FIG. 4, and also in FIGS. 1, 2 and 3, is the blanket gas provided by feeding it into a flexible hose package 4 by which the welding electrode wire also is fed to the welding head 5, where the gas is allowed to exit such that it provides a gas blanket around the welding electrode 1, the electrical arc that may exist between the welding electrode 1 and the welding object 2, and the part of the welding object 2 that is in a molten state.

To achieve an optimum control of the blanket gas flow, a reference value which we presents a target for the gas provided to the welding area must be read. This reference value is read by measuring the current I1 flowing in the electrical welding circuit, which is employed to provide the correct amount of gas to maintain an appropriate blanket of inert gas, being dependent on the welding current I1. In general, the relationship between the blanket gas flow requirement and the magnitude of the current is such that a larger current requires and increased flow of blanket gas.

In order to maintain a proper beginning of the welding operation, blanket gas should be provided in a proper amount during a certain period prior to the start of the actual welding, and preferably also during the actual onset on the welding. The onset of the actual welding is considered to the represented by the onset of a significant current flow in the welding electrode.

The provision of a proper flow of blanket gas to the welding area in accordance with the requirements specified herein, is according to the present invention achieved by detecting a voltage being applied to the welding electrode and providing a control signal to a blanket gas flow regulator, which signal in turn causes an actuation of a gas flow control means of the gas regulator, which initiates and maintains a proper level of blanket gas flow during the appropriate period prior to the onset of the actual welding, and, preferably also during the onset of the welding operation.

Figure 5:
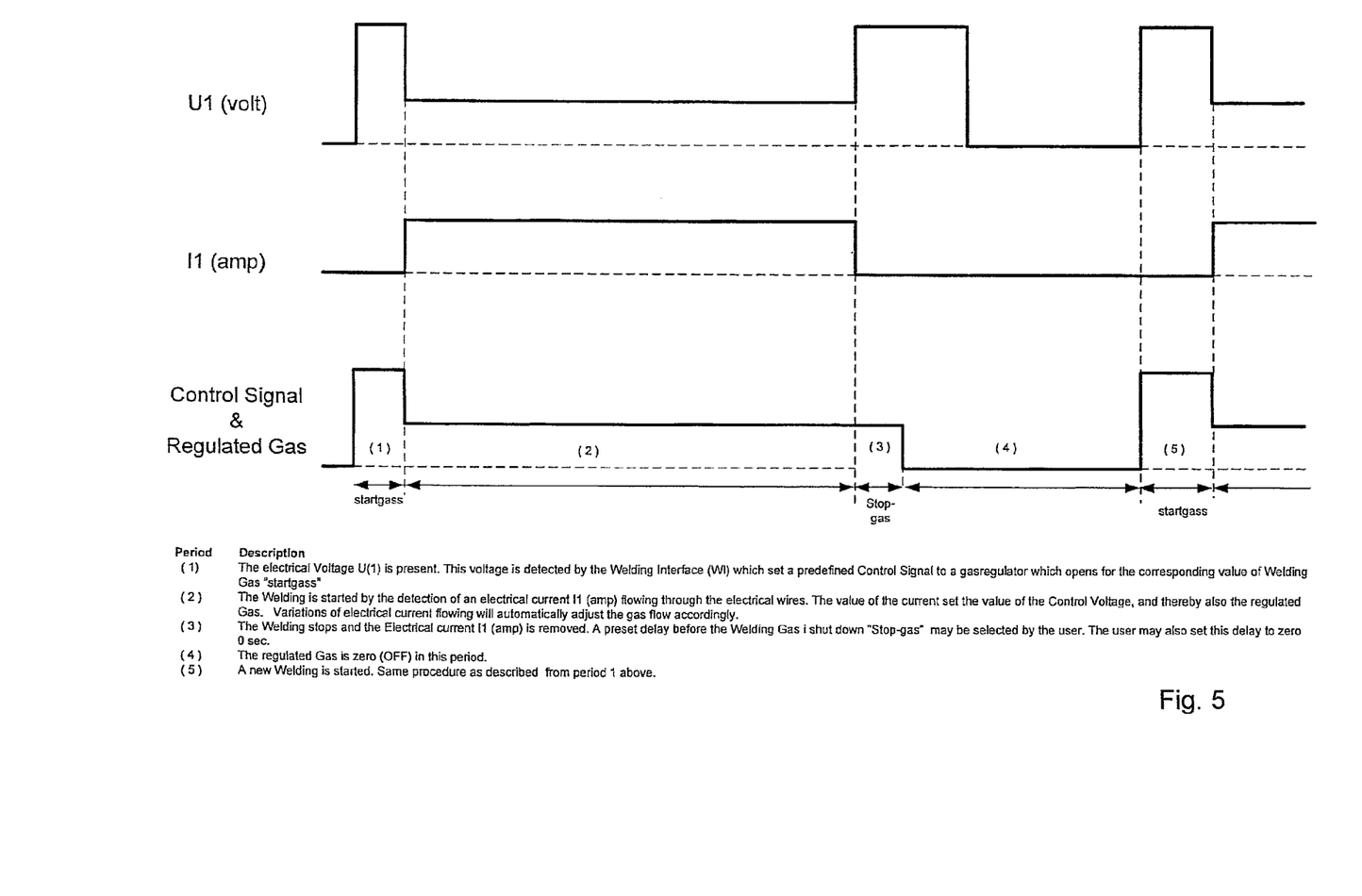
FIG. 5 is a first curve chart illustrating the temporal relation chips between control signals and gas flow rates for a first embodiment of the present invention.

With reference to FIG. 5, which maybe studied in relation to the schematic illustration provided by FIG. 1, a curve chart is provided to explain by way of example signals that may be observed in an embodiment of the invention employing a welding interface device 6 having inputs from a voltage sensor 10 and a current sensor 3, and a control signal output to be provided to a gas regulator 7. Preferably, the gas regulator 7 is of a type of an arrangement and operating according to method as disclosed in Norwegian patent application no. 20021557. In FIG. 7, the input signals U1 (volt) and I1 (amp) are shown to vary over time in a possible example of a welding operation, while the variation over time of the control signal, and hence of the regulated gas, is shown as the function of the input signals U1 (volt) and I1 (amp). For clarity, the timeline has been divided into sections labelled (1), (2), (3), (4) and (5), wherein, in the first period the control signal is being output with a relatively high amplitude as the voltage U1 (volt) is applied to the welding electrode, and no current has yet started to flow in the electrical welding circuit. During the period (2), a current is flowing in the electrical welding circuit, during which period the voltage U1 (volt) typically drops due to impedances in the power supply of the welding machine 8, during which period (2) the control signal, and hence the flow of blanket gas, is regulated dynamically as a function of the welding current. Using a gas regulator 7 designed and operating according to the disclosure of Norwegian patent application no. 20021557, the control signal, and hence the regulated gas, may typically vary in a proportional relationship to the welding current I1 (amp). In an advantageous embodiment of the mentioned, the gas regulator 7 is adapted to provide a flow of blanket gas after the end of the period (2) during which the welding current flows, which is indicated by the period (3) in FIG. 5, as the post-flow of blanket gas. In a subsequent period, label (4) in FIG. 5, the welding current has been ended and the post flow of blanket gas has completed, while the voltage is still being applied to the welding electrode, during which period (4) the control signal is reduced to a level at which no blanket flow gas is provided by the gas regulator 7 or by any other way. After a period of rest, which has been explained as labelled (4), a new welding operation is started by the application of a voltage to the welding electrode 5, which initiates a control signal at a relatively high level to ensure a proper flow and coverage of blanket gas before the actual welding starts, and, preferably, also at the actual onset of the welding current. Subsequently, the relationships between the voltages U1, current I1 and control signals are as explained in the previous periods.

Typically, to ensure that the control circuit does not miss a level stage or a level transition of the input signals, and to avoid false triggering or generation of the control signals, one or more predetermined thresholds are employed, such that an input signal, such as the I signal and the U signal, are required to be greater than, or possibly less than, a respective threshold to cause a certain control signal to be generated.

Figure 6:
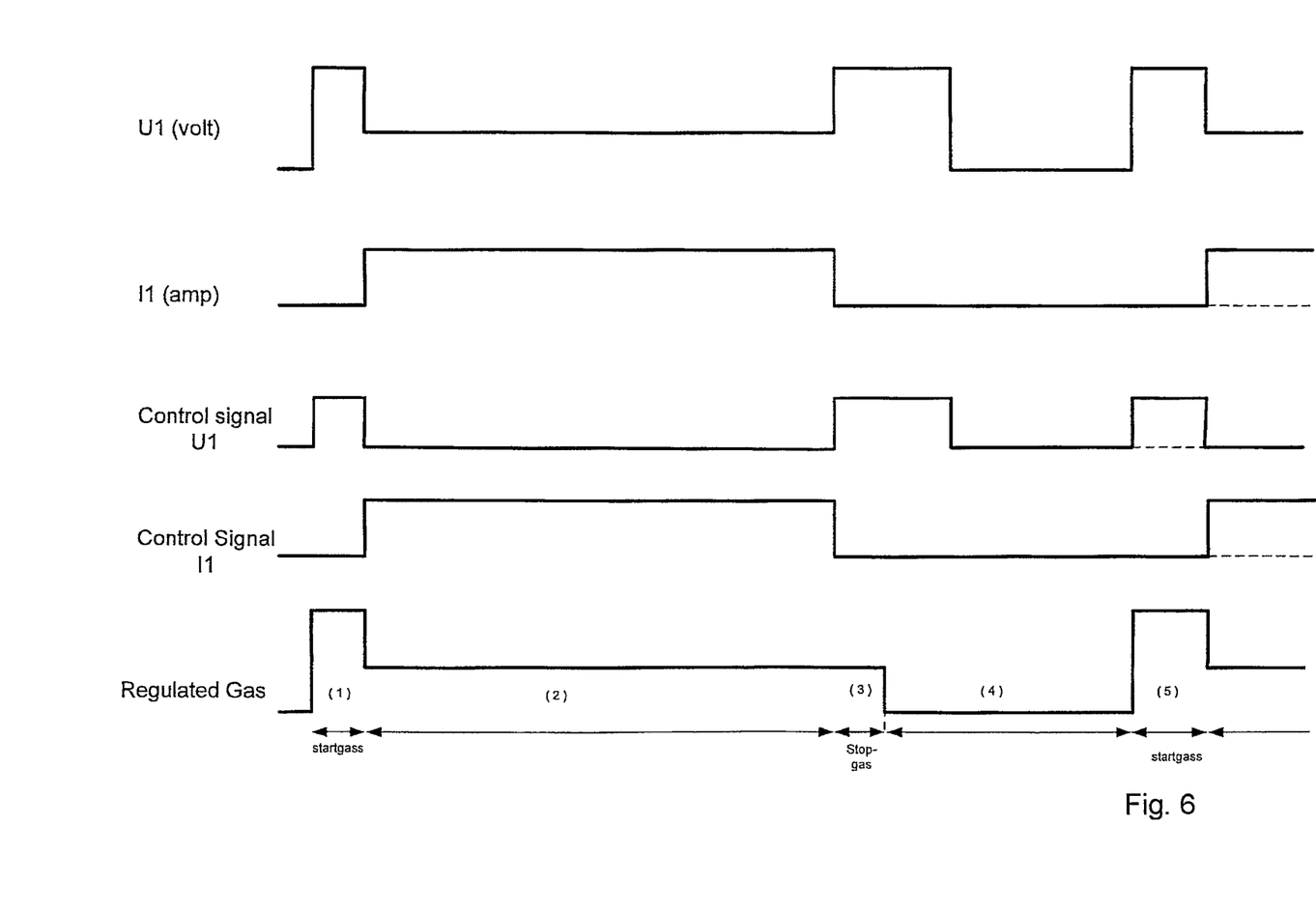
FIG. 6 is a second curve chart illustrating the temporal relation chips of control signals and flow rate of the present invention.

The objectives of the present invention may, as previously explained, also be obtained by an arrangement disclosed and explained with reference to FIG. 3, wherein separate means are provided for controlling the blanket gas flow prior to and during the onset of the welding current, and a separate gas regulator 7 is provided for the dynamic control of the blanket gas flow during the time when the welding current flows and, possibly, also to provide a posed-welding period blanket gas flow. In FIG. 6, the voltage and current signals U1 (volt) and I1 (amp), respectively, are as explained previously with reference to FIG. 5, while the control signals for each of the flow control devices, represented by gas regulator 7 and bypass 9 of FIG. 3, are shown as control signal U1 and control signal I1, respectively. Control signal U1 is applied to the bypass 9 to control the flow of blanket gas prior to and at the onset of the welding current, while the signal labelled control signal I1 is applied to gas regulator 7 to obtain a dynamically controlled blanket gas flow during the period under which there is a flow of welding current. The time period illustrated by FIG. 6 has been divided into smaller periods, labelled (1), (2), (3), (4) and (5), in the same way as for FIG. 5, to identify the relationships of the various signals, and how the flow of blanket gas, labelled regulated gas in FIG. 6, progresses with the progression of the input signals and, hence, the control signals.

A method of controlling the flow of blanket gas for an electrical welding machine unit in a welding facility is also provided by the present invention, the method comprising the actions performed by the operations of the apparatus of the invention as described above, and as disclosed by actions illustrated by the diagrams of the attached drawing figures.

The present invention provides the advantage of better control of the consumption of inert blanket gas for welding operations, which in turn provides economic advantages as well as environmental advantages. When using a noble gas such as Argon (Ar) for a gas blanket, the cost savings are, on the one hand, of prime interest. On the other hand, the environmental benefits are of particular interest in the cases where carbon dioxide ($CO_2$) is used to provide the gas blanket at the welding spot, as a typical consumption when welding in an industrial scale is typically around 18 to 25 liters per minute, and in certain cases as much as 50 liters per minute or more, for a well-known welding machine unit using the gas flow control means and methods of the prior art.

A yet further advantage is the benefit obtained by employing the invention when using an active gas, or gas mixture, to ensure a proper flow and coverage of the active gas of the area of the actual weld, whereby the active ingredients of the gas or gas mixture is present to interact with the weld at all times as required, while avoiding wasting or releasing costly and possibly polluting gas at times when there is no actual need for a supply of the active gas or gas mixture.

The invention claimed is:

1. An apparatus for controlling blanket gas flow in an electrical welding facility, wherein welding is performed using a welding electrode in electrical connection with a welding machine unit, the apparatus comprising:
   (a) an electric measuring device having
      (a1) a current sensor adapted to determine the magnitude of an electrical welding current carried in a circuit incorporating the welding electrode and having a current sensor output adapted to provide a I signal indicating the current magnitude, and
      (a2) a voltage sensor adapted to determine the magnitude of an electrical voltage being applied to the welding electrode and having a voltage sensor output for providing a U signal indicating the voltage magnitude; and
   (b) a control device having
      (b1) inputs connected to the current sensor output and the voltage sensor output, respectively, and a control signal output for providing a control signal to a blanket gas flow controller, and
      (b2) a controller adapted to provide the control signal as
         (i) a control signal of a predetermined first magnitude when the U signal is larger than the first U threshold and the I signal is less than a first I threshold, and
         (ii) a control signal of a magnitude varying proportionally with the I signal when the I signal is greater than the first I threshold.

2. The apparatus of claim 1, wherein the controller is adapted to output the control signal as
   (iii) a control signal of a magnitude varying proportionally with the I signal when the U signal is greater than the first U threshold.

3. The apparatus of claim 2, wherein the controller is adapted to output the control signal as a control signal of a predetermined second magnitude having a predetermined duration from a time when the I signal drops from a higher magnitude to a magnitude being less than the first I threshold or a second I threshold.

4. The apparatus of claim 2, wherein the current sensor includes a current transformer adapted to be connected in a conductor for carrying the welding current between the electrical welding machine unit and an object being or to be welded.

5. The apparatus of claim 2, wherein the blanket gas flow controller is arranged proximal to a high pressure gas supply means being located remotely from the welding machine unit of the electrical welding facility, and
   the control device being a control device unit arranged proximal to the welding machine unit and a location of a welding power supply connection to a flexible hose assembly adapted to supply both blanket gas and electrical power to a welding area of the welding electrode.

6. The apparatus of claim 1, wherein the controller is adapted to output the control signal as a control signal of a predetermined second magnitude having a predetermined duration from a time when the I signal drops from a higher magnitude to a magnitude being less than the first I threshold or a second I threshold.

7. The apparatus of claim 6, wherein the current sensor includes a current transformer adapted to be connected in a conductor for carrying the welding current between the electrical welding machine unit and an object being or to be welded.

8. The apparatus of claim 6, wherein the blanket gas flow controller is arranged proximal to a high pressure gas supply means being located remotely from the welding machine unit of the electrical welding facility, and
   the control device being a control device unit arranged proximal to the welding machine unit and a location of a welding power supply connection to a flexible hose assembly adapted to supply both blanket gas and electrical power to a welding area of the welding electrode.

9. The apparatus of claim 1, wherein the current sensor includes a current transformer adapted to be connected in a conductor for carrying the welding current between the electrical welding machine unit and an object being or to be welded.

10. The apparatus of claim 1, wherein the blanket gas flow controller is arranged proximal to a high pressure gas supply means being located remotely from the welding machine unit of the electrical welding facility, and
    the control device being a control device unit arranged proximal to the welding machine unit and a location of a welding power supply connection to a flexible hose assembly adapted to supply both blanket gas and electrical power to a welding area of the welding electrode.

11. An apparatus for controlling a supply of blanket gas to an electrical welding machine unit of an electrical welding facility where welding is performed using a welding electrode in electrical connection with the welding machine unit, the apparatus comprising:
    (a) an electrical measuring device having
       (a1) a current sensor adapted to determine a magnitude of an electrical welding current carried by the welding electrode and having a current sensor output for outputting a I signal indicating a welding current magnitude, and
       (a2) a voltage sensor adapted to determine a magnitude of an electric voltage being applied to the welding electrode and having a voltage sensor output for outputting a U signal indicating the voltage magnitude; and
    (b) a blanket gas flow control device connected to the current sensor output and the voltage sensor output, and being adapted to control a blanket gas flow between a blanket gas supply means and the welding machine as
       (i) a first blanket gas flow of a predetermined first magnitude when the U signal is greater than a first U threshold and the I signal is less than a first I threshold, and
       (ii) a second blanket gas flow of a second magnitude varying proportionally with the I signal when the I signal is greater than the first I threshold.

12. The apparatus of claim 11, wherein the blanket gas flow controller is adapted to control the flow as
    (iii) a third flow of a third magnitude varying proportionally with the I signal when the U signal is greater than the first U threshold.

13. The apparatus of claim 12, wherein the blanket gas flow controller is adapted to control the flow as a fourth flow of a predetermined fourth magnitude of a predetermined duration from a time when the I signal drops from a higher magnitude to a magnitude being less than the first I threshold or a second I threshold.

14. The apparatus of claim 12, wherein the blanket gas flow controller comprises
- a gas flow regulator arranged proximal to a high pressure gas supply means being located remotely from the welding machine unit and having a control signal input, and
- a welding interface device unit having inputs connected to perspective ones of the voltage sensor and current sensor outputs and a control signal output connected to the control signal input of the gas regulator and being arranged proximal to the welding machine unit and the point of connection of a welding current supply unit to a flexible hose adapted to supply both gas and electrical welding power to a welding head comprising the welding electrode.

15. The apparatus of claim 12, wherein the blanket gas flow regulator is provided by a first gas regulator and a second gas regulator connected in parallel in the gas supply path, the first gas regulator having a control input connected to the current sensor output and being adapted to control blanket gas flow in a proportional relationship with the I signal, and
- the second gas regulator having a control input connected to the voltage sensor output and adapted to control a blanket gas flow of a fixed magnitude when the U signal is greater than a first U threshold.

16. The apparatus of claim 11, wherein the blanket gas flow controller is adapted to control the flow as a fourth flow of a predetermined fourth magnitude of a predetermined duration from a time when the I signal drops from a higher magnitude to a magnitude being less than the first I threshold or a second I threshold.

17. The apparatus of claim 16, wherein the blanket gas flow controller comprises
- a gas flow regulator arranged proximal to a high pressure gas supply means being located remotely from the welding machine unit and having a control signal input, and
- a welding interface device unit having inputs connected to perspective ones of the voltage sensor and current sensor outputs and a control signal output connected to the control signal input of the gas regulator and being arranged proximal to the welding machine unit and the point of connection of a welding current supply unit to a flexible hose adapted to supply both gas and electrical welding power to a welding head comprising the welding electrode.

18. The apparatus of claim 16, wherein the blanket gas flow regulator is provided by a first gas regulator and a second gas regulator connected in parallel in the gas supply path, the first gas regulator having a control input connected to the current sensor output and being adapted to control blanket gas flow in a proportional relationship with the I signal, and
- the second gas regulator having a control input connected to the voltage sensor output and adapted to control a blanket gas flow of a fixed magnitude when the U signal is greater than a first U threshold.

19. The apparatus of claim 11, wherein the blanket gas flow controller comprises
- a gas flow regulator arranged proximal to a high pressure gas supply means being located remotely from the welding machine unit and having a control signal input, and
- a welding interface device unit having inputs connected to perspective ones of the voltage sensor and current sensor outputs and a control signal output connected to the control signal input of the gas regulator and being arranged proximal to the welding machine unit and the point of connection of a welding current supply unit to a flexible hose adapted to supply both gas and electrical welding power to a welding head comprising the welding electrode.

20. The apparatus of claim 11, wherein the blanket gas flow regulator is provided by a first gas regulator and a second gas regulator connected in parallel in the gas supply path, the first gas regulator having a control input connected to the current sensor output and being adapted to control blanket gas flow in a proportional relationship with the I signal, and
- the second gas regulator having a control input connected to the voltage sensor output and adapted to control a blanket gas flow of a fixed magnitude when the U signal is greater than a first U threshold.

\* \* \* \* \*

UNITED STATES PATENT AND TRADEMARK OFFICE
CERTIFICATE OF CORRECTION

PATENT NO. : 8,530,778 B2  Page 1 of 1
APPLICATION NO. : 12/524443
DATED : September 10, 2013
INVENTOR(S) : Arild Halvorsen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1058 days.

Signed and Sealed this

Fifteenth Day of September, 2015

Michelle K. Lee
*Director of the United States Patent and Trademark Office*